United States Patent [19]

Richter et al.

[11] 4,375,410
[45] Mar. 1, 1983

[54] RECIPROCATING DIFFUSER ARRANGEMENTS IN AN ELONGATED VESSEL

[75] Inventors: Johan C. F. C. Richter, St. Jean Cap Ferrat, France; Ole J. Richter, Karlstad, Sweden

[73] Assignee: Kamyr AB, Karlstad, Sweden

[21] Appl. No.: 213,101

[22] Filed: Dec. 4, 1980

Related U.S. Application Data

[62] Division of Ser. No. 34,928, Apr. 25, 1979, Pat. No. 4,276,167.

[51] Int. Cl.³ ............................................. B01D 33/00
[52] U.S. Cl. .................................. 210/323.2; 162/242; 162/251; 162/380; 210/331
[58] Field of Search ................. 162/52, 246, 251, 380, 162/242, 55; 68/181 R; 210/331, 332, 338, 313, 345, 347, 407, 409, 412, 439, 388, 389, 199, 201, 203, 210, 216, 323.2

[56] References Cited

U.S. PATENT DOCUMENTS

| | | | |
|---|---|---|---|
| 3,078,703 | 2/1963 | Richter et al. | 68/181 R |
| 3,579,420 | 5/1971 | Richter | 68/181 R |
| 4,100,069 | 7/1978 | Sherman | 68/181 R |
| 4,172,037 | 10/1979 | Gulston | 68/181 R |

FOREIGN PATENT DOCUMENTS

| | | | |
|---|---|---|---|
| 309085 | 12/1969 | U.S.S.R. | |
| 197712 | 12/1977 | U.S.S.R. | 68/181 R |

*Primary Examiner*—Steve Alvo
*Attorney, Agent, or Firm*—Cushman, Darby & Cushman

[57] ABSTRACT

A diffusion washer and/or thickener assembly is provided that is greatly simplified. A number of withdrawal screens and fluid introducing structures are provided supported by spider arms which comprise conduits for introduction of liquid into and withdrawal of liquid from an elongated upright hollow vessel in which the assembly is disposed. The conduit means, with attached screen structures, is reciprocated up and down by a single linear actuator located preferably above the vessel and within the cross-sectional area thereof so that the wall of the vessel need not be penetrated by the conduits. The screens and fluid introducing structures remain stationary with respect to each other during reciprocation. A number of wiper blades, which may be operated by a single linear actuator, are provided at the top of the vessel for moving upwardly flowing pulp into withdrawal conduits surrounding the vessel periphery.

10 Claims, 8 Drawing Figures

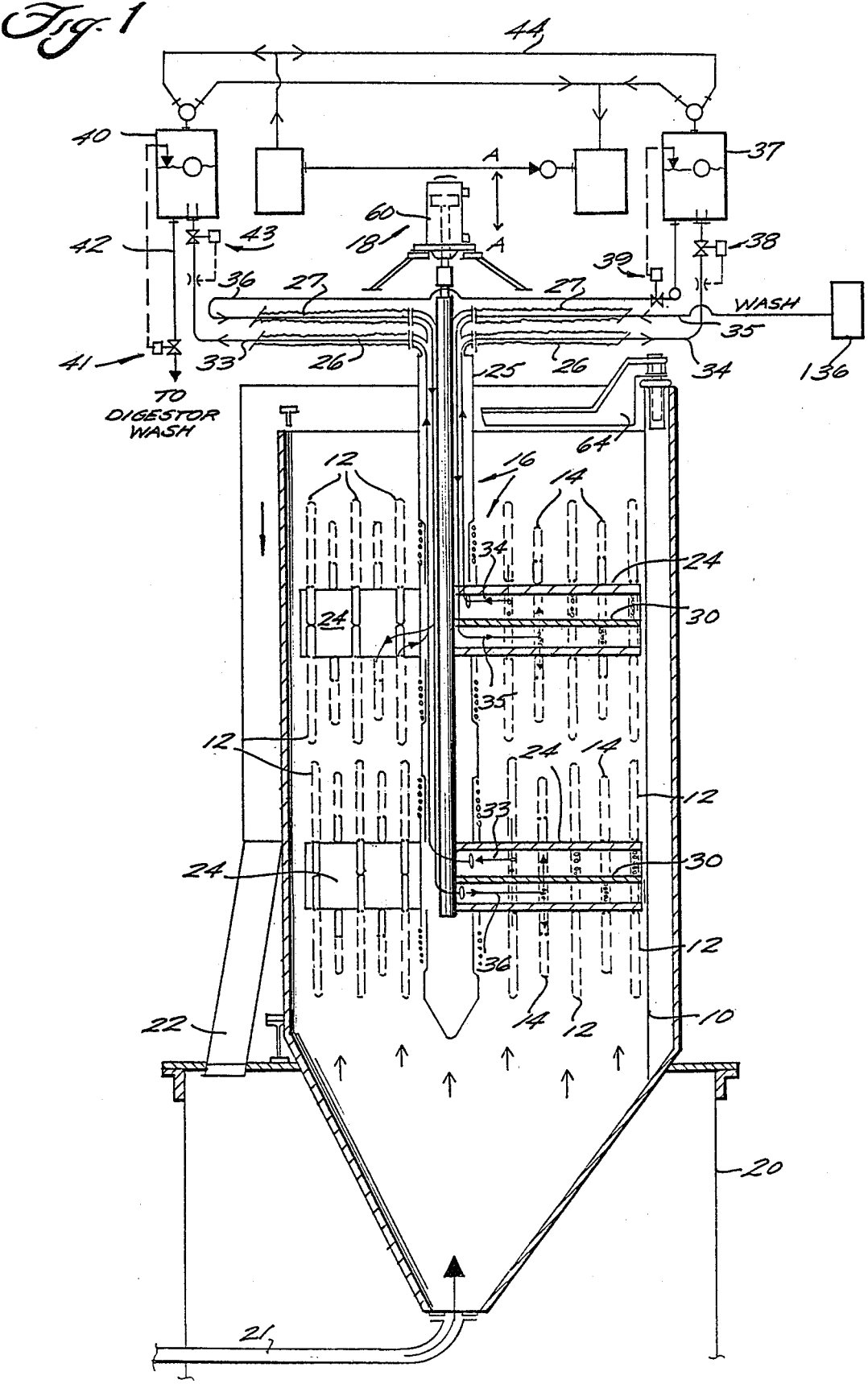

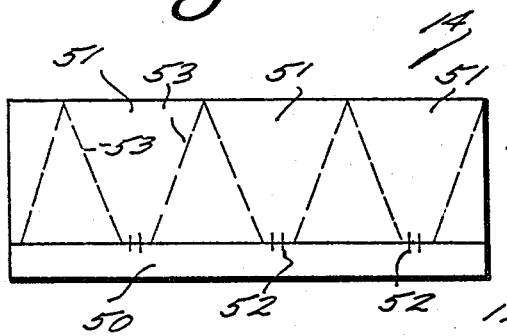
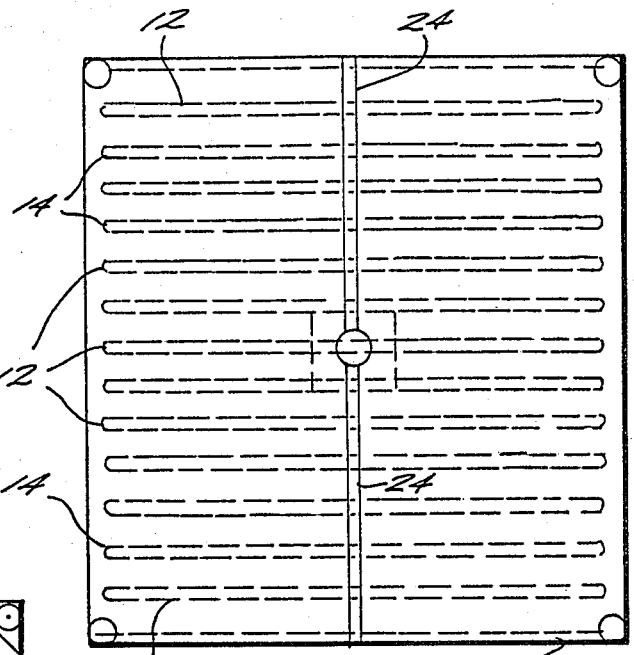
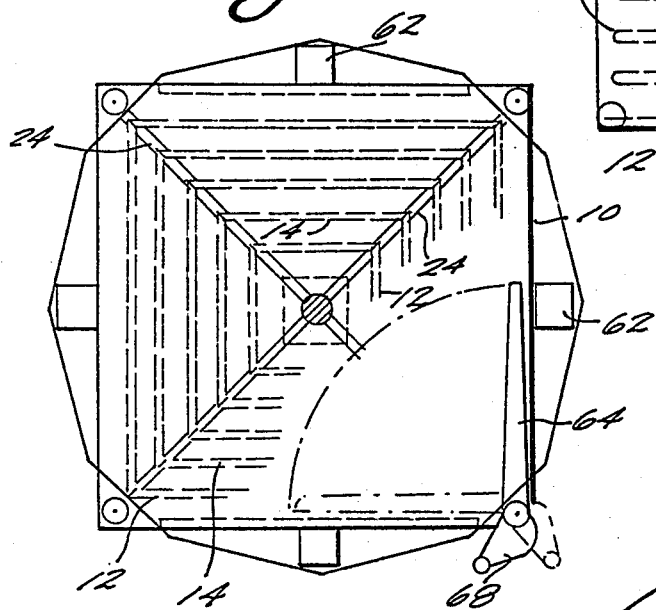
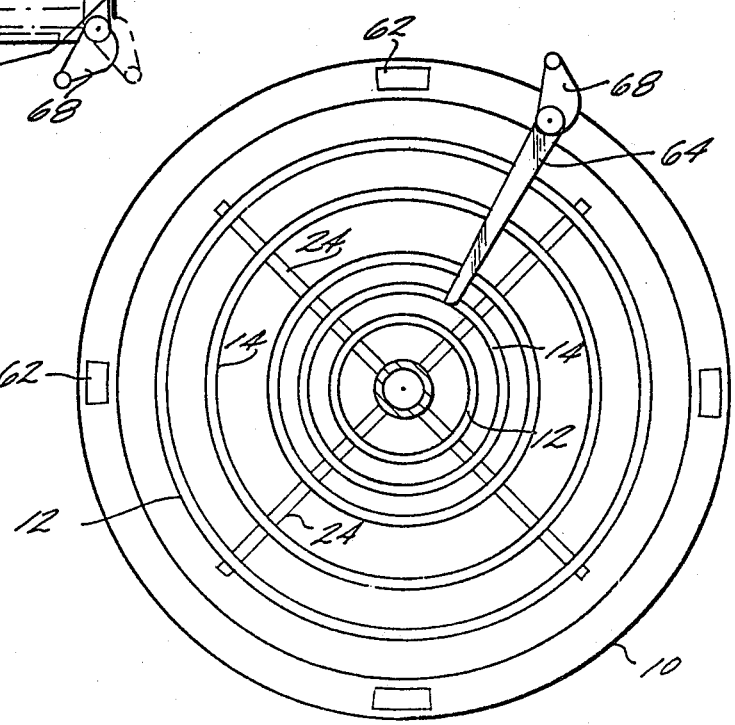

RECIPROCATING DIFFUSER ARRANGEMENTS IN AN ELONGATED VESSEL

This is a division, of application Ser. No. 34,928 filed Apr. 25, 1979, Now U.S. Pat. No. 4,276,167.

BACKGROUND AND SUMMARY OF THE INVENTION

Continuous diffuser washers have been extremely successful in simplifying pulp washing operations, especially immediately after continuous digestion of the pulp. Conventional diffuser washers are usually mounted on the brown stock storage tank and effect washing in a closed system where no air comes in contact with the pulp, reducing the tendency to foam, facilitating pollution abatement, and permitting greater recycling and reuse of liquors. The pulp is passed upwardly in the diffuser vessel and passes between a plurality of concentric withdrawal screen rings, washing liquid being introduced through tubes that are rotating within the areas defined by the screen rings and being attached to a scraper at the top of the vessel. The screens are moved up and down by hydraulic cylinders mounted outside the vessel walls, suitable mechanical interconnections extending through the vessel walls from the cylinders to the screens, and also providing for withdrawal of liquid from the screens through the vessel walls. Such a reciprocating screen arrangement is also useful for thickening of pulp, either in a separate thickening vessel or as part of the diffusion washing sequence. Exemplary prior art diffuser washers and/or thickeners are shown in U.S. Pat. Nos. 3,348,390; 3,372,087; 4,076,623; and 4,100,069.

While conventional continuous washers are successful in performing their intended functions, and provide the most efficient commercially available washing to date, there have been a number of practical problems associated therewith. For instance, because of the ring-like construction, the components are expensive to fabricate, and each screen ring and liquid-introducing nozzle within a given structure must be constructed differently in order to provide varying flow rates to accomplish uniform washing. The ring construction also means that significant bending and twisting stresses are applied to the structure as it is reciprocated up and down, especially providing stress at the connections of the arms to the rings and sometimes resulting in premature failure of the assembly. The relative movement between the diffuser tubes and the screens causes a shock wave in the area between the tubes and screens. The structures for packing the central rotor, and for packing and sealing the arms where they extend through the vessel side walls to the cylinders, are expensive and require considerable maintenance if leakage is to be prevented. Also, rotation of the central rotor results in significant energy usage.

According to the present invention, any problems inherent in prior art continuous diffuser washers are eliminated by providing a greatly simplified structure. The structure according to the present invention has fewer moving parts, has less expensive parts that are easier to fabricate, does not require the vessel side walls to be penetrated at all, and in general provides a more simplified and efficient structure for effecting diffusion washing, bleaching and/or thickening.

According to one aspect of the present invention, an upright hollow vessel is provided containing a plurality of withdrawal screens extending substantially parallel to the vessel direction of elongation, conduit means for supporting the withdrawal screens and for providing passage of fluid from the withdrawal screens to an area remote from the withdrawal screens, and means for reciprocating the conduit means with attached withdrawal screens up and down in a direction substantially coincident with the direction of elongation of the vessel. The reciprocating means consist essentially of a single linear actuator located within the cross-sectional area of the vessel (and preferably above the vessel), the provision of such reciprocating means allowing the conduit means and withdrawal screens to be constructed so that no structures penetrate the vessel walls. All fluid withdrawal, and fluid introduction, comes from above or below the vessel, preferably from above.

According to the present invention, fluid introducing structures are also provided supported by said conduit means, the conduit means providing for passage of fluid from an area remote from the fluid introducing structures to the fluid introducing structures. The withdrawal screens and fluid introducing structures are interspersed with each other and are stationary with respect to each other. This arrangement allows the construction of the withdrawal screens and fluid introcing structures in a wide variety of manners. For instance, instead of being provided as rings, the screens and structures can be disposed in concentric quadrates (when viewed along the vessel direction of elongation), or in parallel straight lines. All of the screens and fluid introducing structures when in a given vessel can thus be constructed in the same manner, and the withdrawal screens and fluid introducing structures can be made interchangeable with each other. The fluid introducing structures are preferably formed as a plurality of plates having openings formed therein that are larger and more widely spaced than openings provided in the withdrawal screens, the openings being prismoid in configuration and having a larger cross-sectional area closer to the fluid introducing structure end than the center.

In order to effect removal of the upward flowing pulp from the vessel, since the central rotating scrapers of the prior art structures have been eliminated some alternative structure must be provided. The alternative structure preferably consists essentially of a plurality of distinct wiper blades elongated in a direction perpendicular to the direction of elongation of the vessel, and means for oscillating the wiper blades about axes parallel to the direction of elongation of the vessel. The oscillating means are preferably disposed above the vessel and within the cross-sectional area thereof, a single linear actuator being provided for actuation of all of the wiper blades at the same time. The vessel may be a polygon in cross-section with withdrawal conduits provided along each side of the vessel, and with a wiper blade mounted at each corner of the vessel at the top thereof. Where the vessel is quadrate in cross-section, each wiper blade has an effective length of slightly more than one-half the length of the vessel sides merging to form the corner at which the blade is disposed.

The linear actuator for reciprocating the conduit means with attached withdrawal screens up and down preferably moves the structures upwardly at a first rate a predetermined distance, and then downwardly at a second rate the predetermined distance, the second rate being much greater than the first rate and great enough to facilitate dislodgement of materials clinging to faces of the withdrawal screens when in use for treating pulp. This action is described in U.S. Pat. Nos. 3,348,390 and 3,372,087. Alternatively, the structures could be continuously oscillated utilizing a mechanism such as described in U.S. Pat. No. 4,076,623. The apparatus according to the present invention is best suited for the washing and/or thickening of cellolusic pulp material having a consistency of about 6–15% (8–12% being the approximate maximum efficiency range), and performs its intended functions in a simple and efficient manner.

It is the primary object of the present invention to provide an improved apparatus and method especially adapted for washing, bleaching, and/or thickening of pulp. This and other objects of the invention will become clear from an inspection of the detailed description of the invention, and from the appended claims.

BRIEF DESCRIPTION OF THE DRAWINGS

FIG. 1 is a cross-sectional schematic view of exemplary apparatus according to the present invention;

FIGS. 2–4 are top schematic views of exemplary withdrawal screen and fluid introducing structure configurations that may be provided according to the invention;

FIG. 8 is a detailed view of an exemplary form of construction of the fluid introducing structure openings that may be utilized in practicing the invention.

DETAILED DESCRIPTION OF THE DRAWINGS

Figure 5:
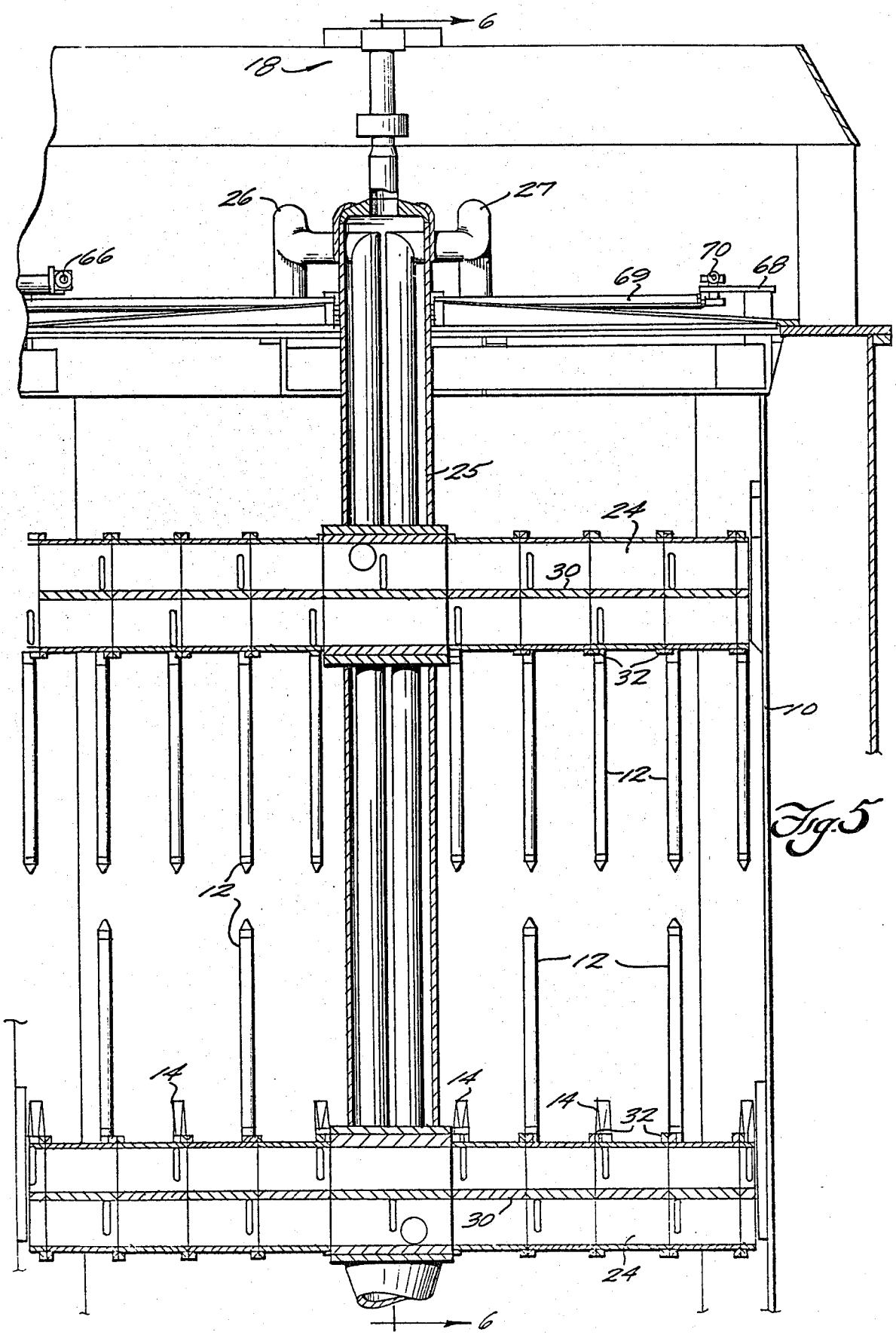
FIG. 5 is a side cross-sectional view of another exemplary form of apparatus according to the invention, taken along lines 5—5 of FIG. 6.
Figure 6:
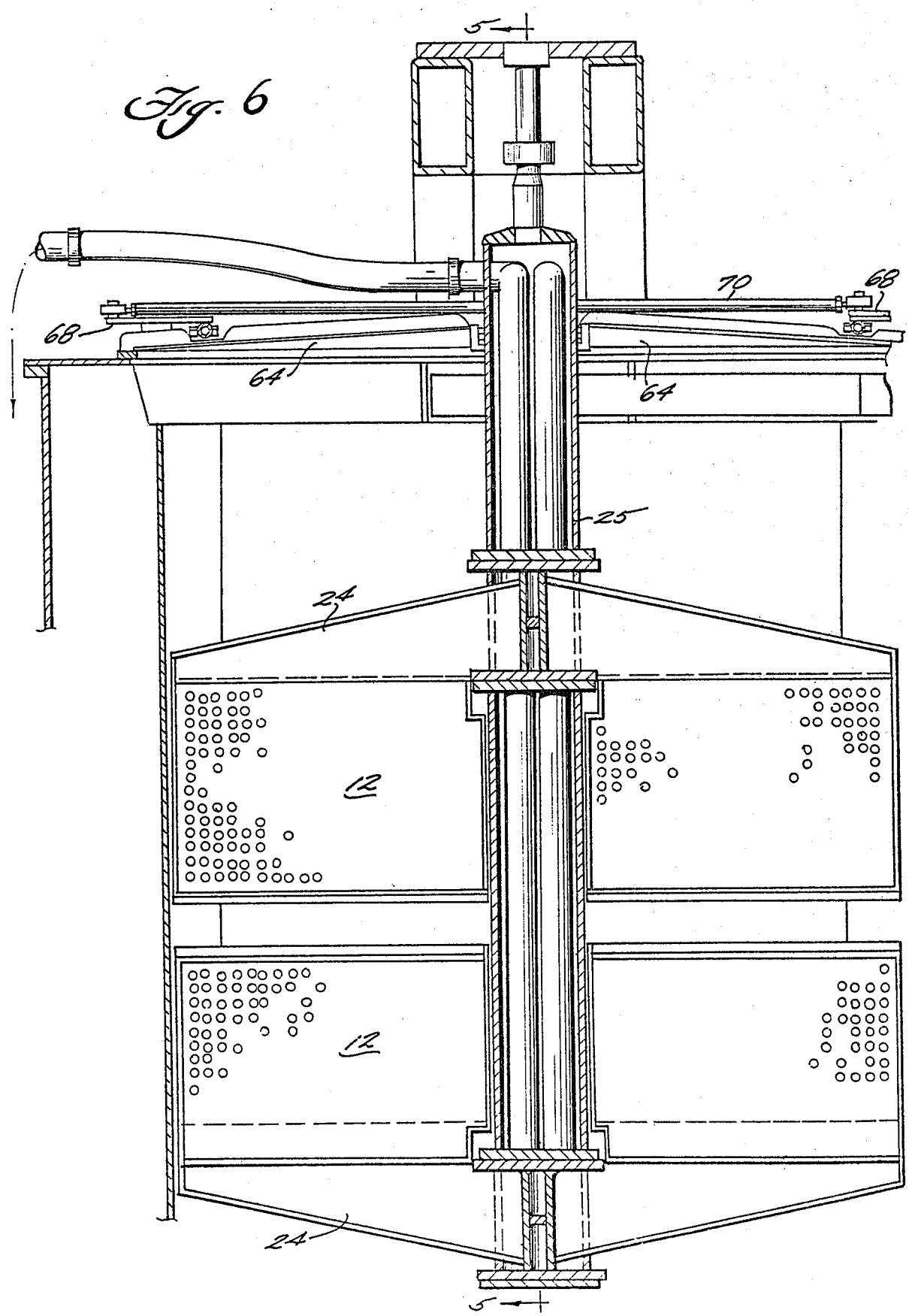
FIG. 6 is a cross-sectional view taken along lines 6—6 of FIG. 5.

The basic apparatus according to the present invention includes an elongated upright hollow vessel 10, a plurality of withdrawal screens 12, and a plurality of fluid introducing structures 14, conduit means 16, and means 18 for reciprocating the conduit means back and forth in the direction A—A of elongation of the vessel 10. The vessel 10 would normally be mounted on a brown stock storage tank 20, with an inlet 21 being provided from the washing stage of a continuous digester, and with an outlet 22 being provided from the vessel 10 to the brown stock/tank/20. However, the apparatus according to the invention is not restricted to such an environment, and can be utilized in any place where washing, bleaching, and/or thickening is desired, with suitable interconnections to associated structures being provided.

The withdrawal screens 12 extend substantially parallel to the direction A—A and are spaced from each other in one or more directions perpendicular to the vessel direction of elongation. The fluid introducing structures 14 may comprise spaced tubular members, but preferably are provided by plates (see FIGS. 2–4 in particular), the plates having openings formed therein that are larger and more widely spaced than the openings provided in the screens 12. The total area of the openings provided in the fluid introducing means 14 as compared to the screens 12 may be approximately one-tenth or less, in order to create the pressure differential desired for uniform distribution. If desired portions of the structures 14 connected to the conduit means 16 may be solid (as shown in FIG. 1), the openings not being provided until positions more remote from the conduit means 16.

The conduit means 16 preferably take the form of a plurality of spider arms 24 which extend radially outwardly from a central tubular portion 25 extending in the direction of elongation A—A of the vessel 10. Flexible withdrawal and inlet conduits 26, 27 respectively are operatively connected to the central portion 25 as illustrated in FIG. 1. The conduit means 16 support the screens 12 and structures 14 so that they are interspersed with each other and stationary with respect to each other and provide for passage of fluid from an area remote from the structures 14 to the structures 14, and for passage of fluid from the screens 12 to an area remote from the screens 12.

In many situations, more than one set of screens 12 and/or structures 14 will be provided, and in such a situation interior partitioning means 30 will be provided in the arms 24 and central portion 25 to provide for separate introduction and withdrawal of fluids. Any number of spider arms 24 arrangement, with associated screens 12 and fluid introducing structures 14, may be provided in the vessel 10, two such arrangements being illustrated in the FIG. 1 and FIG. 5 embodiments.

In the FIG. 1 embodiment, each spider arm 24 arrangement includes one set of screens 12 and structures 14 extending upwardly therefrom, and another set extending downwardly therefrom. In the FIG. 5 embodiment, the upper spider arm 24 assembly includes one set of screens 12 extending downwardly therefrom, and the bottom spider arm 24 assembly includes one set of screens 12 extending upwardly therefrom with interspersed fluid introducing structures 14.

The screens 12 and fluid introducing structures 14 may take a wide variety of configurations. For instance, in FIG. 2 the screens 12 and structures 14 are disposed in concentric quadrates when viewed along the vessel direction of elongation A—A with the spider arms 24 interconnecting the corners of the quadrates. In FIG. 3, the screens 12 and structures 14 are shown disposed in concentric circles, and in FIGS. 1, and 4–6 the screens 12 and structures 14 are shown disposed in parallel straight lines when viewed along the direction A—A, with the conduit means arm 24 extending perpendicularly to the straight lines. In the embodiments of FIGS. 2 and 4, less stress will be placed on the interconnections between the arms and the screens 12 than when a ring configuration is provided, and the screens 12 and structures 14 can be welded directly to the arms 24. In the FIGS. 1 and 4–6 embodiment, all of the screens 12, and all of the distributing structures 14, can be made in the same manner, and connections 32 (see FIG. 5) may be provided at the arms 24 that allow interconnection of either screens 12 or fluid distributing devices 14 thereat.

An exemplary manner in which the conduit means 16 may provide for the introduction to and withdrawal of fluid from the vessel 10 is illustrated in FIG. 1. Withdrawal for the lower spider arm 24 assembly is provided through a first passage, indicated by arrows 33, withdrawal from the top spider arm 24 assembly is provided by another passageway indicated by arrows 34, fluid introduction to the structures 14 of the top spider arm assembly 24 is provided through a passageway indicated by arrows 35, and fluid for the lower spider arm assembly 24 is introduced by a passageway indicated by arrows 36. The fluid introduced into pathway 35 is preferably wash liquid from a source 136 or the like. Liquid withdrawn from the screens 12 connected to pathway 34 passes to a tank 37 through a flow controlled valve arrangement 38, and that liquid can be used as the wash water for pathway 36, the flow from the tank 37 into pathway 36 being controlled by a level-controlled valve assembly 39. Liquid withdrawn through the screens 12 connected to the pathway 33 passes through flow control valve assembly 43 to tank 40, and that liquid may in turn pass level-responsive valve assembly 41 through line 42 to be used as wash liquid in the bottom of the continuous digester to which the vessel 10 is connected. A de-aeration system 44 also is provided, which facilitates the creation of static backwash when the extraction valve assemblies 38, 43 are closed.

If desired, an appropriate pressure differential for uniform distribution may be provided by splitting the flow of the liquid being introduced so that it is one-half of the suction. In such a situation two pipes may be separately run into the spider arms, and a valve timed to switch between the pipes at predetermined intervals (e.g. 10 seconds). The openings in the fluid introducing structures, which are larger and more widely spaced than the openings provided in the withdrawal screens 12, may be prismoid in configuration, as illustrated in FIG. 8. In FIG. 8, a section of fluid introducing structure 14 is illustrated having a central portion 50 thereof through which liquid to be introduced flows, a plurality of openings 51 being provided are operatively connected through orifices 52 to the structure 50. The openings 51 have slanted walls 53 in both dimensions so that they take a prismoid configuration, having a small cross-sectional area at the center of the structure 14 (adjacent opening 52) and having a larger cross-sectional area at the end thereof. Such an arrangement is more fully described in U.S. Pat. No. 3,913,838 (the disclosure of which is hereby incorporated by reference herein), and ensures that clogging of the openings 51 will be avoided. The openings 51 may be oriented so that they introduce the liquid vertically or horizontally.

The reciprocating means 18 preferably consists of a single linear actuator 60, which is preferably mounted above the vessel 10 and within the cross-sectional area thereof. The actuator 60 moves the conduit means 16 with attached screens 12 and structures 14 upwardly at a first rate a predetermined distance, and then downwardly at a second rate the predetermined distance, the second rate being much greater than the first rate and great enough to facilitate dislodgement of materials clinging to the screen faces when in use for treating pulp. Such an action is more fully described in U.S. Pat. No. 3,372,087. Normally, the upward velocity of the pulp is matched by the screens 12 during the upward movement. If operation in this manner is desired the linear actuator 60 preferably may comprise a hydraulic cylinder. Alternatively, a reciprocating mechanism such as employed in U.S. Pat. No. 4,076,623 may be employed when a different reciprocating action is desired.

Figure 7:
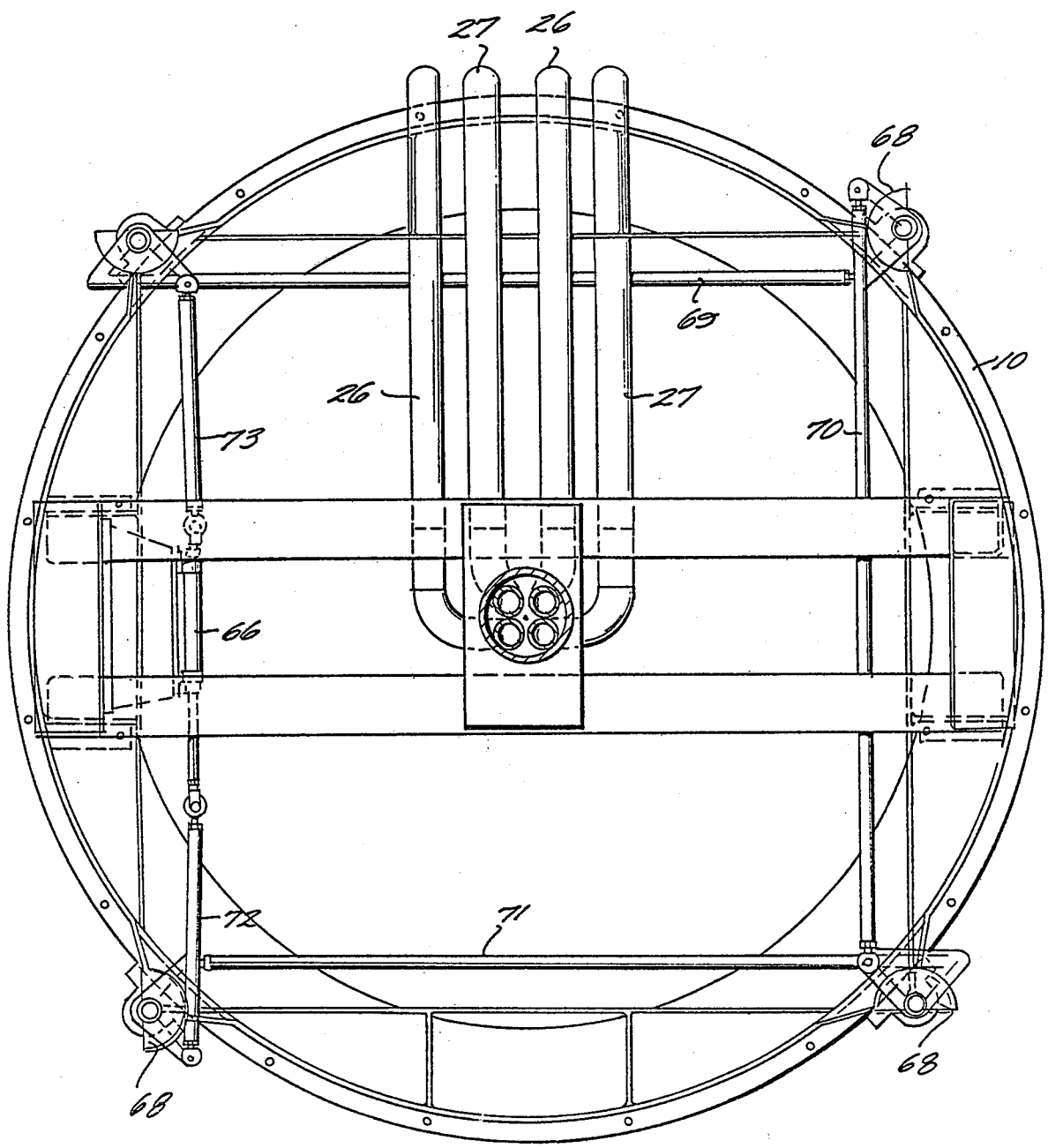
FIG. 7 is a top plan view of the embodiment of FIGS. 5 and 6.

In normal use of the vessel 10, pulp will flow upwardly therein, and a mechanism must be provided at the top of the vessel 10 for withdrawal of the treated pulp. A plurality of withdrawal conduits 62 (see FIGS. 1, 2, and 3 in particular) are provided around the periphery of the vessel 10 at the top thereof. The means for distributing pulp from the interior of the vessel at the top thereof into the conduit 62 comprise a plurality of distinct wiper blades 64 (only one of which is shown in FIGS. 1-3) and means for oscillating the wiper blades 64 about axis parallel to the direction of elongation A—A of the vessel 10. Exemplary oscillating means are illustrated most clearly in FIGS. 5-7, and may comprise a single linear actuator (such as a hydraulic cylinder) 66 (see FIG. 7) mounted above the vessel 10 and within the cross-sectional area thereof. Each wiper blade 64 is connected to a plate 68, which in turn is pivotally connected to a pair of levers, such as levers 69, 70 (see FIG. 7) the levers 69, 70, and 71—together with the levers 72, 73 which are connected to the linear actuator 66—forming the sides of a polygon, and operating the wipers 64 so that they do not interfere with each other but so that they move the pulp from the interior of the vessel toward the conduit 62. As shown in FIG. 2, the vessel 10 may be quadrate in cross-section with withdrawal conduits 62 provided along each side thereof and a wiper blade 64 mounted at each corner of the vessel at the top thereof, with each wiper blade having an effective length of slightly more than one-half of the length of the vessel sides merging to form the corner at which the blade 64 is disposed.

The apparatus according to the present invention is most useful for treating pulp having a consistency of about 6-15%, and can be utilized for bleaching, washing, and/or thickening of the pulp. In an exemplary manner of treating pulp according to the present invention, the pulp is passed from a continuous digester through conduit 21 to the vessel 10, flowing upwardly in the vessel 10. As it flows upwardly between the screens 12 and fluid introducing structures 14, it is acted upon by the fluid being introduced, and liquid is withdrawn therefrom and passed to a point exterior of the vessel 10. Pulp is withdrawn from the top of the vessel 10 by oscillating the wiper blades 64 to move the pulp into the conduits 62, which conduits 62 lead to an outlet 22 which conveys the pulp to a brown stock storage tank 20, or like structure (depending upon the treatment being provided for the pulp in the vessel 10). As the pulp is passed upwardly in the vessel 10, the screens 12 and structures 14—which remain stationary with respect to each other—are reciprocated upwardly and downwardly in the vessel along the vessel direction of elongation A—A. Preferably, the screens 12 and structures 14 are moved upwardly at a first relatively slow rate, approximately matching the upflow rate of the pulp in the vessel 10, and then the screens 12 and structures 14 are moved downwardly at a second rate much greater than the first rate, and great enough to facilitate dislodgement of pulp clinging to the faces of the screens 12.

It will thus be seen that according to the present invention a simple structure has been provided which eliminates most of the problems associated with prior art diffusion washers and the like. While the invention has been herein shown and described in what is presently conceived to be the most practical and preferred embodiment thereof, it will apparent to those of ordinary skill in the art that many modifications may be made thereof within the scope of the invention, which scope is to be accorded the broadest interpretation of the appended claims so as to encompass all equivalent structures and methods.

What is claimed is:

1. In an elongated upright hollow vessel the combination comprising:
a plurality of withdrawal screens extending substantially parallel to the vessel direction of elongation and spaced from each other in directions perpendicular to the vessel direction of elongation, said screens disposed in at least two screen sets, one above the other with the screens of each screen set parallel to the screens of each other set;

a plurality of fluid introducing structures extending substantially parallel to the vessel direction of elongation and spaced from each other in directions perpendicular to the vessel direction of elongation, said structures introducing fluid out of the sides thereof, and disposed in sets corresponding to said withdrawal screen sets;

conduit means, including a central tubular portion extending in the direction of elongation of the vessel, for supporting said withdrawal screens and said fluid introducing structures of each set so that the screens and structures are interspersed with each other and stationary with respect to each other, and said conduit means being in fluid communication with said screens and said fluid introducing structures and said conduit means including a final passage means for each set for providing passage of fluid from an area remote from said fluid introducing structures through said tubular portion to said fluid introducing structures so that the fluid flows between and into contact with the screens of the same set as the fluid introducing structures, and said conduit means including a second passage means for each set for passage of fluid from said withdrawal screens through said tubular portion to an area remote from said withdrawal screens;

means for simultaneously reciprocating all of said conduit means with attached withdrawal screens and fluid introducing structures of each set in a direction substantially coincident with the direction of elongation of the vessel; and means for introducing fluent material to be treated into said vessel and into said first passage means and means for withdrawing treated fluent material from said second passage means out of said vessel.

2. A combination as recited in claim 1 wherein said reciprocating means is disposed above the vessel, and wherein said conduit means further comprises flexible withdrawal conduits attached to said central tubular portion above the vessel.

3. A combination as recited in claim 1 or 2 wherein said reciprocating means comprises means for moving said conduit means with attached screens and structures upwardly at a first rate a predetermined distance, and then downwardly at a second rate the predetermined distance, one of said rates being much greater than the other of said rates, and great enough to facilitate dislodgement of material clinging to faces of said withdrawal screens when in use for treating pulp.

4. A combination as recited in claim 1 wherein said withdrawal screens and fluid introducing means are interchangeably connected to said conduit means.

5. A combination as recited in claim 1 wherein said fluid introducing structures comprise a plurality of plates, said plates having openings formed therein that are larger and more widely spaced than openings provided in said withdrawal screens.

6. A combination as recited in claim 1 wherein said fluid introducing structures comprise a plurality of tubular members having openings formed along the length thereof.

7. A combination as recited in claim 5 and claim 6 wherein said openings are prismoid in configuration, having a larger cross-sectional area closer to the respective fluid introducing structure end than center.

8. A combination as recited in claim 1, wherein said withdrawal screens and fluid introducing structures are disposed in concentric circles when viewed along the vessel direction of the elongation.

9. A combination as recited in claim 1 wherein said withdrawal screens and said fluid introducing structures are disposed in concentric quadrates when viewed along the vessel direction of elongation, and wherein said conduit means comprises spider arms extending perpendicularly to the vessel direction of elongation and interconnecting the corners of the quadrates.

10. A combination as recited in claim 1 wherein said reciprocating means comprises a single linear actuator.

* * * * *